(12) United States Patent
Moon et al.

(10) Patent No.: US 9,131,229 B2
(45) Date of Patent: Sep. 8, 2015

(54) METHOD OF GENERATING SYNC SIGNAL FOR CONTROLLING 3D GLASSES OF 3D IMAGE SYSTEM, AND METHOD AND APPARATUS FOR TRANSMITTING AND RECEIVING THE SYNC SIGNAL

(75) Inventors: Soo-bae Moon, Suwon-si (KR); Ho-seop Lee, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 579 days.

(21) Appl. No.: 12/938,605

(22) Filed: Nov. 3, 2010

(65) Prior Publication Data
US 2011/0102426 A1    May 5, 2011

Related U.S. Application Data

(60) Provisional application No. 61/257,601, filed on Nov. 3, 2009.

(30) Foreign Application Priority Data

Oct. 28, 2010    (KR) .......................... 10-2010-0106034

(51) Int. Cl.
*H04N 9/47*    (2006.01)
*H04N 13/04*    (2006.01)

(52) U.S. Cl.
CPC ................................. *H04N 13/0438* (2013.01)

(58) Field of Classification Search
USPC ..................................... 348/53; 345/8; 349/15
See application file for complete search history.

(56) References Cited

U.S. PATENT DOCUMENTS

| | | | | |
|---|---|---|---|---|
| 6,057,811 | A * | 5/2000 | Edwards | 345/8 |
| 6,791,599 | B1 * | 9/2004 | Okada et al. | 348/56 |
| 2005/0041736 | A1 * | 2/2005 | Butler-Smith et al. | 375/240.01 |
| 2005/0243224 | A1 * | 11/2005 | Choi et al. | 349/11 |

(Continued)

FOREIGN PATENT DOCUMENTS

KR    10-2002-0021427 A    3/2002
KR        100476436 B1    3/2005

(Continued)

OTHER PUBLICATIONS

Communication, dated Aug. 20, 2012, issued in corresponding Korean Patent Application No. 10-2010-0106034.

(Continued)

*Primary Examiner* — Tracy Li
(74) *Attorney, Agent, or Firm* — Sughrue Mion, PLLC (57) ABSTRACT

A method of generating a sync signal for controlling three-dimensional (3D) glasses in a 3D image system, methods of transmitting and receiving a 3D glasses control sync signal, and apparatuses for transmitting and receiving the 3D glasses control sync signal are provided. The method of generating a 3D glasses control sync signal includes: generating sync signal start indicator information notifying a start of a 3D glasses control sync signal, state sequence mode information indicating an operating state of the 3D glasses with regard to whether a left glass or a right glass is opened or closed, and sequence duty information indicating a retaining time period of the operating state of the 3D glasses; and generating the 3D glasses controlling signal by combining the generated sync signal start indicator information, the generated state sequence mode information, and the generated sequence duty information according to a set order.

51 Claims, 7 Drawing Sheets

(56) References Cited

U.S. PATENT DOCUMENTS

| | | |
|---|---|---|
| 2009/0237327 A1 | 9/2009 | Park et al. |
| 2010/0026794 A1* | 2/2010 | Chang .............................. 348/56 |
| 2010/0091207 A1* | 4/2010 | Hasegawa et al. .............. 349/15 |

FOREIGN PATENT DOCUMENTS

| | | |
|---|---|---|
| KR | 10-2009-0101623 A | 9/2009 |
| KR | 10-1246297 B1 | 4/2013 |

OTHER PUBLICATIONS

Communication dated Apr. 6, 2012 issued by the Korean Intellectual Property Office in counterpart Korean Patent Application No. 10-2010-0106034.

Communication dated Dec. 18, 2012 from the Korean Intellectual Property Office in a counterpart application No. 10-2010-0106034.

Communication dated Feb. 27, 2015 issued by the Korean Intellectual Property Office in counterpart Application No. 10-2012-0061084.

* cited by examiner

METHOD OF GENERATING SYNC SIGNAL FOR CONTROLLING 3D GLASSES OF 3D IMAGE SYSTEM, AND METHOD AND APPARATUS FOR TRANSMITTING AND RECEIVING THE SYNC SIGNAL

CROSS-REFERENCE TO RELATED PATENT APPLICATIONS

This application claims priority from Korean Patent Application No. 10-2010-0106034, filed on Oct. 28, 2010 in the Korean Intellectual Property Office, and U.S. Provisional Application No. 61/257,601, filed on Nov. 3, 2009, the disclosures of which are incorporated herein in their entireties by reference.

BACKGROUND

1. Field

Methods and apparatuses consistent with exemplary embodiments relate to a three-dimensional (3D) image system, and more particularly, to a method and apparatus for generating a 3D glasses control sync signal in the 3D image system, and a method and apparatus for transmitting and receiving the 3D glasses control sync signal.

2. Description of the Related Art

Three-dimensional (3D) glasses use binocular disparity to allow a viewer to perceive images as 3D images. Specifically, an image viewed by the left eye and an image viewed by the right eye may be perceived differently from each other, and the perceived difference between the image viewed by the left eye and the image viewed by the right eye is called binocular disparity. The brain is trained to see binocular disparity as depth information.

Using binocular disparity, a 3D display device outputs a left eye image and a right eye image, and controls a left shutter and a right shutter of 3D glasses worn by a user to be turned on or off according to when the left eye image and the right eye image are output from the 3D display device, thereby enabling the left eye to see the left eye image and the right eye to see the right eye image and allowing the user to perceive an image as a 3D image.

In a related art liquid crystal display (LCD) shutter driving signal, an infrared (IR) transmitter of a display device periodically transmits a sync signal Vsync at 60 Hz. That is, the display device displays left and right eye images at 60 Hz, and sends a sync signal to operate left and right shutters of 3D glasses according to the period. Accordingly, a receiver of the 3D glasses receives the sync signal, and drives the left and right shutters synchronously with the left and right images displayed on the display device.

Here, the sync signal Vsync for controlling the 3D glasses may cause interference with an existing remote control signal.

In addition, in a related art 3D image system, the 3D glasses operate in various manners according to manufacturers or displaying methods of 3D display devices, and thus various 3D glasses respectively corresponding to the 3D display devices are required.

SUMMARY

One or more exemplary embodiments provide a method of generating a sync signal for controlling three-dimensional (3D) glasses for operating various 3D display devices using a single pair of glasses, wherein the sync signal does not interfere with an existing remote control signal, methods of transmitting and receiving the sync signal, and apparatuses for transmitting and receiving the sync signal.

According to an aspect of an exemplary embodiment, there is provided a method of generating a sync signal for controlling 3D glasses in a 3D image system, the method including: generating sync signal start indicator information notifying a start of a 3D glasses control sync signal, state sequence mode information indicating an operating state of the 3D glasses in terms of whether a left glass or a right glass is opened or closed, and sequence duty information indicating a retaining time period of the operating state of the 3D glasses; and generating a 3D glasses control sync signal by combining the pieces of generated information according to a set order.

The method may further include generating sync signal end indicator information notifying an end of the 3D glasses control sync signal.

The method may further include generating a sync signal period information indicating a period of the 3D glasses control sync signal.

The method may further include generating delay period information indicating a delay time from after receiving the 3D glasses control sync signal before the 3D glasses start operating.

The sequence duty information may include a retaining time period of the operating state of the 3D glasses that is adjusted based on operating characteristics of a 3D display to obtain optimum 3D performance.

The 3D glasses control sync signal may be generated at every period of N frames in synchronization with a left eye image signal or a right eye image signal, where N is a natural number greater than or equal to 1.

A period of the 3D glasses control sync signal may be generated variably for every set of frames.

The 3D glasses control sync signal may be generated at a longer period than a length of a remote control signal.

The 3D glasses control sync signal may be configured using a pulse modulation method.

The method may further include transmitting the 3D glasses control sync signal to the 3D glasses in synchronization with an image sync signal.

According to an aspect of another exemplary embodiment, there is provided a method of transmitting a 3D glasses control sync signal in a 3D image system, the method including: adjusting an operating state and an operating order of 3D glasses and a retaining time period of the operating state of the 3D glasses; generating the 3D glasses control sync signal including information about the adjusted operating state and the adjusted operating order of the 3D glasses and the adjusted retaining time period of the operating state of the 3D glasses, at a set frame period; and transmitting the generated 3D glasses control sync signal to the 3D glasses in synchronization with an image sync signal.

The operating state and the operating order of the 3D glasses and the retaining time period of the operating state of the 3D glasses may be adjusted according to a display type in order to obtain optimum 3D performance.

According to an aspect of another exemplary embodiment, there is provided a method of receiving a 3D glasses control sync signal in a 3D image system, the method including: receiving a 3D glasses control sync signal including information about an operating state and an operating order of 3D glasses and a retaining time period of the operating state of the 3D glasses; generating a shutter driving control signal according to each piece of information included in the received 3D glasses control sync signal; and driving a shutter according to the generated shutter driving control signal.

According to an aspect of another exemplary embodiment, there is provided an apparatus for transmitting a 3D glasses control sync signal of a 3D image system, the apparatus including: a transmission control unit which generates a 3D glasses control sync signal including information about an operating state and an operating order of 3D glasses and a retaining time period of the operating state of the 3D glasses, at a set frame period; and an infrared transmitting unit which modulates the 3D glasses control sync signal generated by the transmission control unit, to an infrared signal, and transmits the infrared signal to the 3D glasses.

The 3D glasses control sync signal may include a sync signal start indicator field notifying a start of the 3D glasses control sync signal, a sync signal period field indicating a period of the 3D glasses control sync signal, a state sequence mode field indicating the operating state of the 3D glasses in terms of whether a left glass or a right glass is opened or closed, a sequence duty field indicating the retaining time period of the operating state of the 3D glasses, and a sync signal end indicator field notifying an end of the 3D glasses control sync signal.

The transmission control unit may generate the 3D glasses control sync signal at the set frame period in synchronization with a left eye image signal.

The transmission control unit may generate the 3D glasses control sync signal at a longer period than a length of a remote control signal.

According to an aspect of another exemplary embodiment, there is provided an apparatus for receiving a 3D glasses control sync signal of a 3D image system, the apparatus including: an infrared receiving unit which receives a 3D glasses control sync signal including information about an operating state and an operating order of 3D glasses and a retaining time period of the operating state of the 3D glasses, in synchronization with an image sync signal; a reception control unit which generates a shutter driving control signal based on each piece of information included in the 3D glasses control sync signal received by the infrared receiving unit; and a glasses shutter unit which drives a shutter according to the shutter driving control signal generated by the reception control unit.

According to an aspect of another exemplary embodiment, there is provided a 3D image system including: a display device which generates an image sync signal for left eye and right eye 3D images; a sync signal transmitting apparatus which transmits a 3D glasses control sync signal including information about an operating state and an operating order of 3D glasses and a retaining time period of the operating state of the 3D glasses, in synchronization with the image sync signal at a set frame period; and a sync signal receiving apparatus which receives the 3D glasses control sync signal from the sync signal transmitting apparatus to generate a shutter driving control signal based on each piece of information included in the 3D glasses control sync signal.

According to an aspect of another exemplary embodiment, there is provided a method of generating a sync signal for controlling 3D glasses in a 3D image system, the method including: generating a 3D glasses control sync signal including information about an operating state and an operating order of the 3D glasses and a retaining time period of the operating state of the 3D glasses, at a set frame period; and transmitting the generated 3D glasses control sync signal.

BRIEF DESCRIPTION OF THE DRAWINGS

The above and/or other aspects will become more apparent by describing in detail exemplary embodiments with reference to the attached drawings in which.

DETAILED DESCRIPTION OF EXEMPLARY EMBODIMENTS

Exemplary embodiments will now be described more fully with reference to the accompanying drawings, in which like reference numerals refer to like elements throughout. Expressions such as "at least one of," when preceding a list of elements, modify the entire list of elements and do not modify the individual elements of the list.

Figure 1:
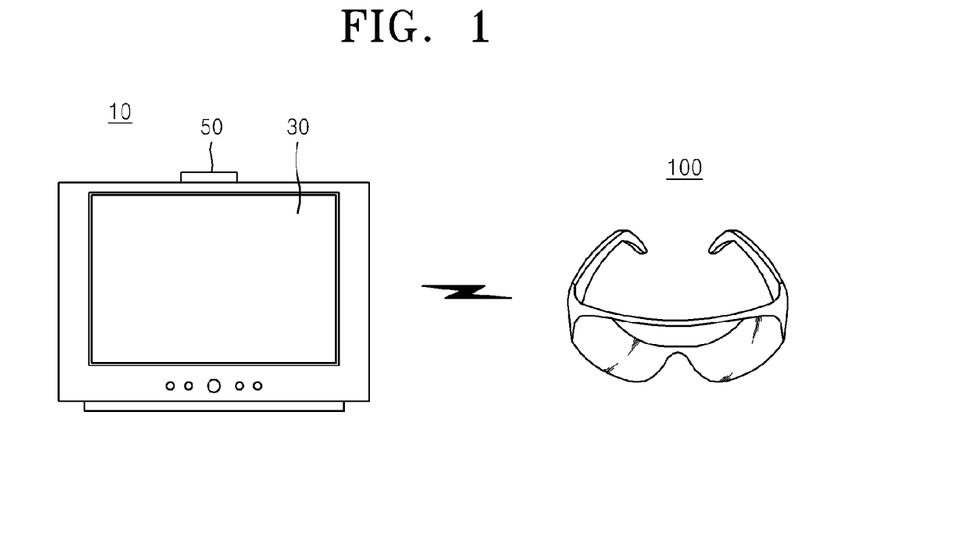
FIG. 1 schematically illustrates a 3D image system according to an exemplary embodiment.

FIG. 1 schematically illustrates a 3D image system according to an exemplary embodiment.

Referring to FIG. 1, the 3D image system includes a display device 10 and 3D glasses 100 through which a 3D image can be viewed.

The display device 10 generates a left eye image and a right eye image and alternately outputs the generated image to a user. The display device 10 includes a display 30 and a synchronization transmitter 50.

The display 30 generates a left eye image and a right eye image, and alternately outputs the left eye image and the right eye image at predetermined time intervals. Furthermore, the display 30 generates image Vsync signals for left eye and right eye 3D images.

The synchronization transmitter 50 generates a 3D glasses control sync signal including information about an operating state of the 3D glasses, an operating order of the 3D glasses, and retaining time information of the operating state of the 3D glasses, and generates the 3D glasses control sync signal at a set frame period in synchronization with an image sync signal.

For example, the display device 10 transmits a 3D glasses control sync signal in synchronization with the left eye image signal and the right eye image signal to the 3D glasses 100 using an infrared (IR) transmission method.

It is understood that another exemplary embodiment is not limited to the IR transmission method. For example, according to another exemplary embodiment, the 3D glasses control sync signal may be transmitted to the 3D glasses 100 via a transmission method other than the IR transmission method, such as Bluetooth, a wireless local area network (WLAN), ZigBee communication, etc.

The 3D glasses 100 receives a 3D glasses control sync signal that is transmitted from the synchronization transmitter 50 of the display device 10 to alternately open a left eye glass and a right eye glass in synchronization with the left eye image and the right eye image displayed on the display 50.

Figure 2A:
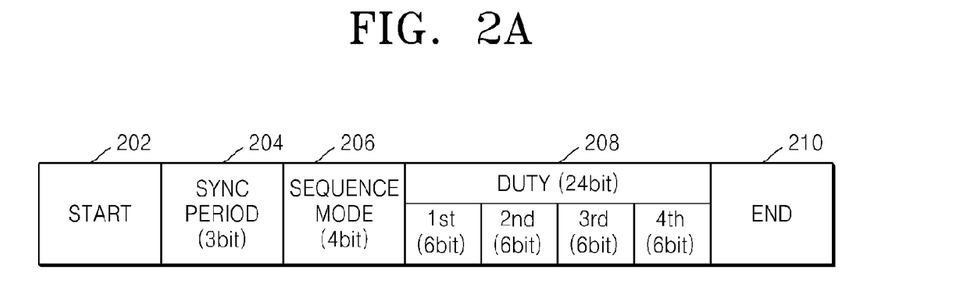
FIG. 2A illustrates a format of a 3D glasses control sync signal according to an exemplary embodiment.

FIG. 2A illustrates a format of a 3D glasses control sync signal according to an exemplary embodiment.

Referring to FIG. 23A, the format includes a sync signal start indicator field 202, a sync signal period field 204, a state sequence mode field 206, a sequence duty field 208, and a sync signal end indicator field 210.

The sync signal start indicator field 202 increases a signal-to-noise ratio (S/N) by reducing a signal reception gain of the 3D glasses 100 before a sync signal is transmitted to the 3D glasses 100, and indicates a start portion of the sync signal.

For example, the sync signal start indicator field 202 is formed of a plurality of pulse signals having a burst width of 1 ms.

The sync signal period field 204 defines a period at which a sync signal for controlling an operation of 3D glasses is generated.

For example, when 3 bits (bit 30-28), the sync signal period field 204 may be defined as follows:
   000=Every falling edge
   001=Every 2nd falling edge
   010=Every 4th falling edge
   011=Every 8th falling edge
   100=Every 16th falling edge
   101=Every 32nd falling edge
   110=Every 64th falling edge
   111=Every 128th falling edge The state sequence mode field 206 defines an operating state of the 3D glasses in terms of whether a left glass or a right glass is opened or closed, and an operating order of the left and right glasses.

For example, when 4 bits (bit 27-24 ), the state sequence mode field 206 may be defined as follows, where L denotes left side open and right side closed, R denotes right side open and left side closed, 0 denotes both sides open, B denotes both sides closed, and Dual View denotes Dual view or two-dimensional (2D) mode:
   0000=LLRR mode
   0001=RRLL mode
   0010=LBRB mode
   0011=RBLB mode
   0100=BLBR mode
   0101=BRBL mode
   0110=Dual View Mode or 2D mode
   0111=Reserved for future use
   1000=Reserved for future use
   1001=Reserved for future use
   1010=Reserved for future use
   1011=Reserved for future use
   1100=Reserved for future use
   1101=Reserved for future use
   1110=Reserved for future use
   1111=Reserved for future use The sequence duty field 208 indicates a retaining time period of the operating state of 3D glasses.

For example, when formed of first through fourth frame duty timings, and each frame duty timing is set as 6 bits, the sequence duty field 208 may be defined as follows:

bit 23-18: 1st Frame Duty Timing
   000000=0
   000001=1/64 frame
   000010=2/64 frame
   111101=62/64 frame
   111110=63/64 frame
   111111=1 frame
   bit 17-12: 2nd Frame Duty Timing
   000000=0
   000001=1/64 frame
   000010=2/64 frame
   111101=62/64 frame
   111110=63/64 frame
   111111=1 frame
   bit 11-6: 3rd Frame Duty Timing
   000000=0
   000001=1/64 frame
   000010=2/64 frame
   111101=62/64 frame
   111110=63/64 frame
   111111=1 frame
   bit 5-0: 4th Frame Duty Timing
   000000=0
   000001=1/64 frame
   000010=2/64 frame
   111101=62/64 frame
   111110=63/64 frame
   111111=1 frame The sync signal end indicator field 210 indicates that a sync signal has ended.

For example, the sync signal end indicator field 210 is formed of a plurality of pulse signals having a burst width of 1 ms.

Alternatively, in order to obtain optimum 3D performance, a delay period field indicating a delay time after receiving a 3D glasses control sync signal and before the 3D glasses start operating may be further included in the 3D glasses control sync signal according to a manufacturer or a type of the display device 10.

Figure 2B:
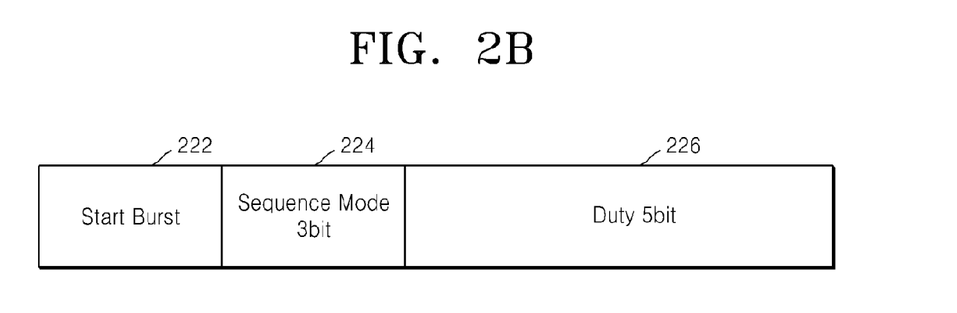
FIG. 2B illustrates a format of a 3D glasses control sync signal according to another exemplary embodiment.

FIG. 2B illustrates a format of a 3D glasses control sync signal according to another exemplary embodiment.

Referring to FIG. 2B, the format includes a sync signal start indicator field 222, a state sequence mode field 224, and a sequence duty field 226.

The sync signal start indicator field 222 has the same or similar operation as that of the sync signal start indicator field 202 illustrated in FIG. 2A and thus a description thereof will be omitted herein. The sync signal start indicator field 222 is formed of a burst.

The state sequence mode field 224 has the same or similar operation as that of the state sequence field 206 illustrated in FIG. 2A and thus a description thereof will be omitted herein. The state sequence mode field 224 may be 3 bits.

For example, when the state sequence mode field 224 is 3 bits (bit 7-5), the state sequence mode field 224 may be defined as follows:
   000=LBRB mode
   001=RBLB mode
   010=BLBR mode
   011=BRBL mode
   100=Dual View Mode or 2D mode
   101=Reserved for future use
   110=Reserved for future use
   111=Reserved for future use
   bit 4-0 FDT<4:0>: 1st Frame Duty Timing
   00000=0% (0 ms)
   00001=12.5% (1.04 ms)

00010=15.63% (1.30 ms)
11011=93.75% (7.81 ms)
11100=96.88% (8.07 ms)
11101=100% (8.33 ms)
11110=Reserved for future use
11111=Reserved for future use The sequence duty field 226 has the same or similar operation as that of the sequence duty field 208 illustrated in FIG. 2A. The sequence duty field 226 may be 5 bits.

Figure 3A:
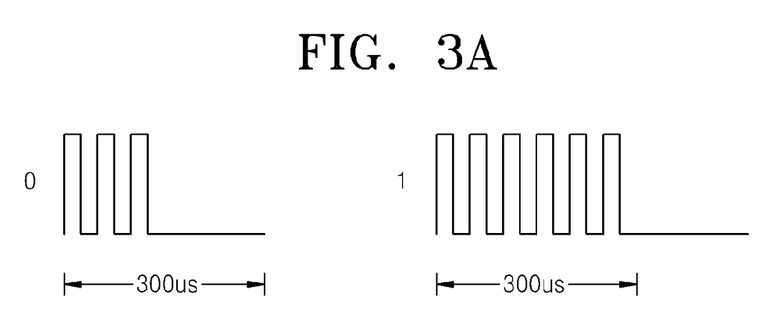
FIGS. 3A through 3C illustrate a pulse signal for a sync signal, according to an exemplary embodiment.
Figure 3B:
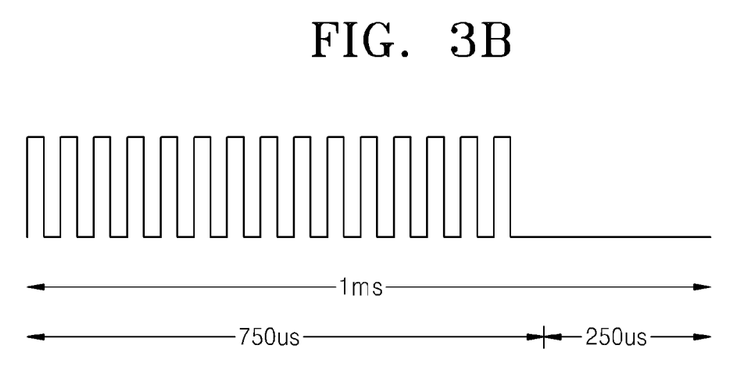
Figure 3C:
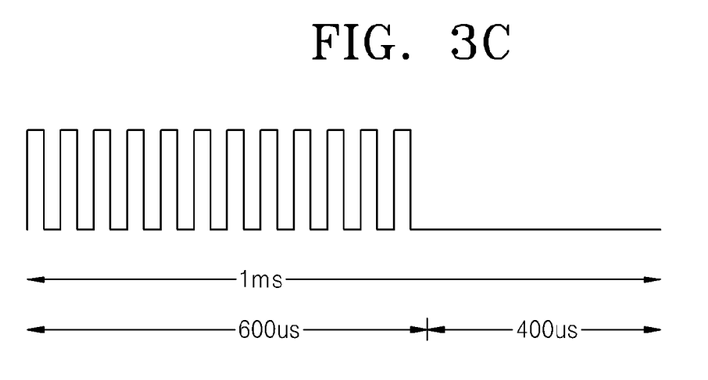

FIGS. 3A through 3C illustrate a pulse signal for a sync signal, according to an exemplary embodiment.

Referring to FIG. 3A, a 3D glasses control sync signal is displayed as logic "0" and "1" of a pulse modulation method. In addition, the 3D glasses control sync signal uses a carrier frequency range from 20-50 kHz, e.g., a carrier frequency of 20.5 kHz.

As illustrated in FIGS. 3B and 3C, the sync signal start indicator field 202 and the sync signal end indicator field 210 are formed of a plurality of pulse signals having a burst width of 1 ms.

Accordingly, by lowering a carrier frequency of the 3D glasses control sync signal to be lower than a carrier frequency of a related art 3D glasses control sync signal, interference with a switching frequency of an illumination stabilizer may be avoided.

In addition, by generating a 3D glasses control sync signal by using a pulse modulation method, saturation of an infrared signal with respect to distance and robustness of the 3D glasses control sync signal to noise may be increased.

Figure 4A:
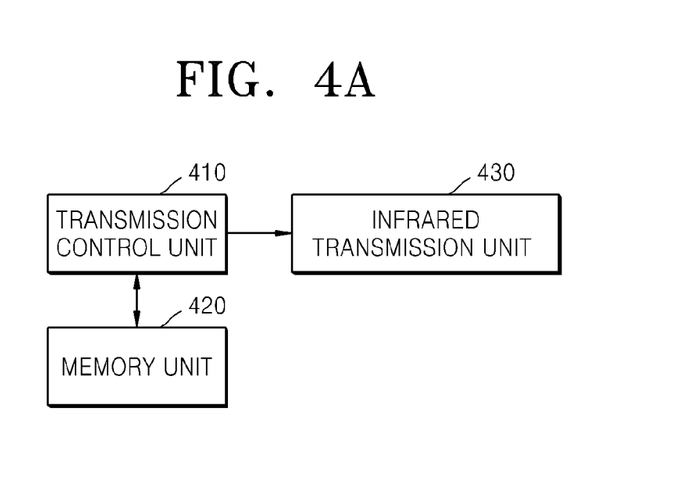
FIG. 4A is a detailed block diagram illustrating a synchronization transmitter according to an exemplary embodiment.

FIG. 4A is a detailed block diagram illustrating a synchronization transmitter 50, according to an exemplary embodiment.

Referring to FIG. 4A, the synchronization transmitter 50 includes a transmission control unit 410, a memory unit 420, and an infrared transmitting unit 430.

The transmission control unit 410 generates a 3D glasses control sync signal by adjusting an operating state and an operating order of the 3D glasses 100 and a retaining time period of the operating state of the 3D glasses, and generates the 3D glasses control sync signal in synchronization with an image sync signal at every set frame period.

The 3D glasses control sync signal includes a sync signal start indicator field, a sync signal end indicator field, a sync signal period field, a state sequence mode field, and a sequence duty field.

In addition, the 3D glasses control sync signal is generated at every period of N frames, where N is a natural number of 1 or greater.

In addition, the 3D glasses control sync signal is generated at a longer period than a length of a remote control infrared signal.

The memory unit 420 stores the sync signal start indicator field, the sync signal end indicator field, the sync signal period field, the state sequence mode field, and the sequence duty field. For example, the memory unit 420 may be a magnetic recording medium, such as a hard disk, or a non-volatile memory, such as an electrically erasable programmable read-only memory (EEPROM), a flash memory, etc, though it is understood that another exemplary embodiment is not limited thereto.

The infrared transmitting unit 430 modulates the 3D glasses control sync signal generated by the transmission control unit 410 to an infrared signal and transmits the same to the 3D glasses 100.

Thus, according to the present exemplary embodiment, as the information for controlling the 3D glasses is included in the 3D glasses control sync signal, various types of 3D displays (e.g., a liquid crystal display (LCD), a plasma display panel (PDP), etc.) may be optimally operated by using a single pair of glasses.

In addition, by prolonging a period of the 3D glasses control sync signal to be longer than a period of an existing remote control signal, signal interference between the 3D glasses control sync signal and the existing remote control signal may be avoided.

Figure 4B:
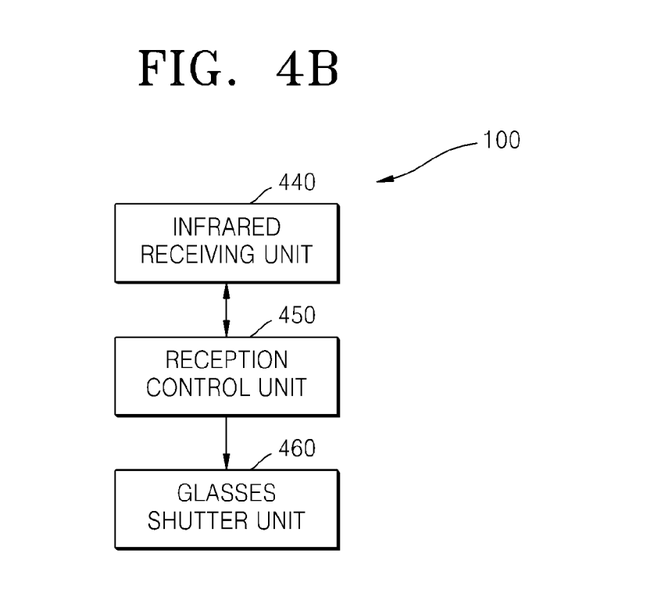
FIG. 4B is a detailed block diagram illustrating 3D glasses according to an exemplary embodiment.

FIG. 4B is a detailed block diagram illustrating 3D glasses 100 according to an exemplary embodiment.

Referring to FIG. 4B, the 3D glasses 100 include an infrared receiving unit 440, a reception control unit 450, and a glasses shutter unit 460.

The infrared receiving unit 440 receives, from a synchronization transmitter 50 according to an exemplary embodiment, a 3D glasses control sync signal that is synchronized with an image sync signal.

The reception control unit 450 generates a shutter driving control signal based on information of each of the fields included in the 3D glasses control sync signal received by the infrared receiving unit 440.

The glasses shutter unit 460 performs an operation of opening or closing a shutter according to the shutter driving control signal generated by the reception control unit 450.

Figure 5A:
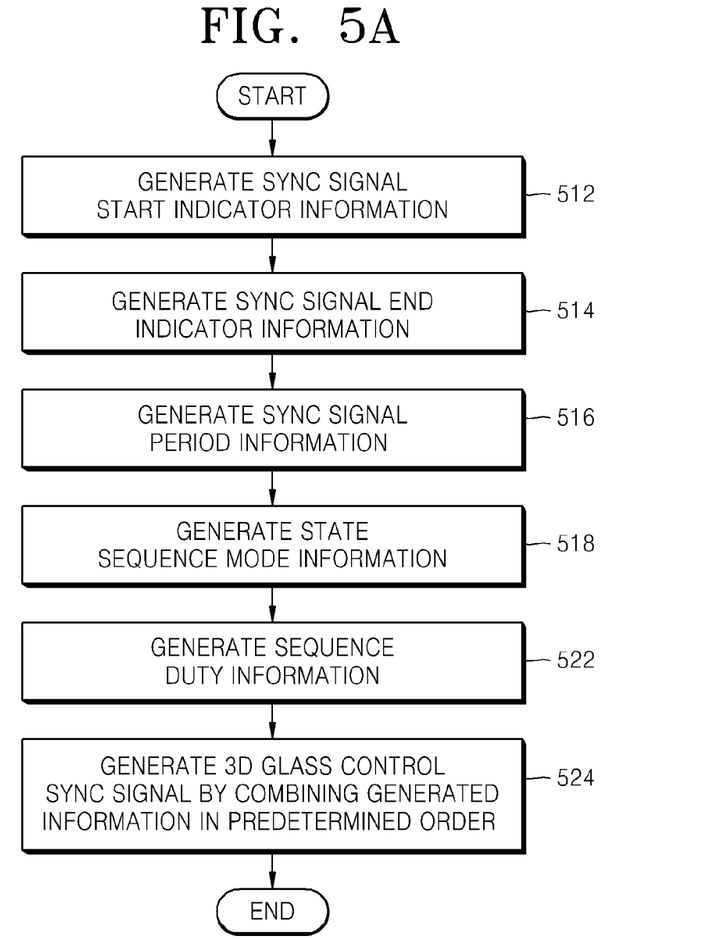
FIG. 5A is a flowchart illustrating a method of generating a 3D glasses control sync signal, according to an exemplary embodiment.

FIG. 5A is a flowchart illustrating a method of generating a 3D glasses control sync signal, according to an exemplary embodiment.

Referring to FIG. 5A, in operation 512, a synchronization transmitter 50 according to an exemplary embodiment generates sync signal start indicator information notifying a start of a 3D glasses control sync signal.

In operation 514, the synchronization transmitter 50 generates sync signal end indicator information notifying an end of a 3D glasses control sync signal.

In operation 516, the synchronization transmitter 50 generates sync signal period information indicating a period of the 3D glasses control sync signal.

In operation 518, the synchronization transmitter 50 generates state sequence mode information indicating an operating state of 3D glasses 100 according to an exemplary embodiment, an operating state of the 3D glasses in terms of whether a left glass or a right glass is opened or closed, and an operating order of the 3D glasses. The operating order of the 3D glasses is adjusted based on the operating characteristics of a 3D display to obtain optimum 3D performance.

In operation 522, the synchronization transmitter 50 generates sequence duty information indicating a retaining time period of the operating state of the 3D glasses. The retaining time period of the operating state of the 3D glasses is adjusted based on the operating characteristics of the 3D display to obtain optimum 3D performance.

In operation 524, the synchronization transmitter 50 generates a 3D glasses control sync signal by combining the pieces of generated information according to a set order.

According to another exemplary embodiment, the synchronization transmitter 50 may further include delay period information indicating a delay time from after receiving the 3D glasses control sync signal before the 3D glasses start operating, in the 3D glasses control sync signal.

The 3D glasses control sync signal including the sync signal start indicator information, the sync signal end indicator information, the sync signal period information, the state sequence mode information, and the sequence duty information is transmitted to the 3D glasses 100.

Figure 5B:
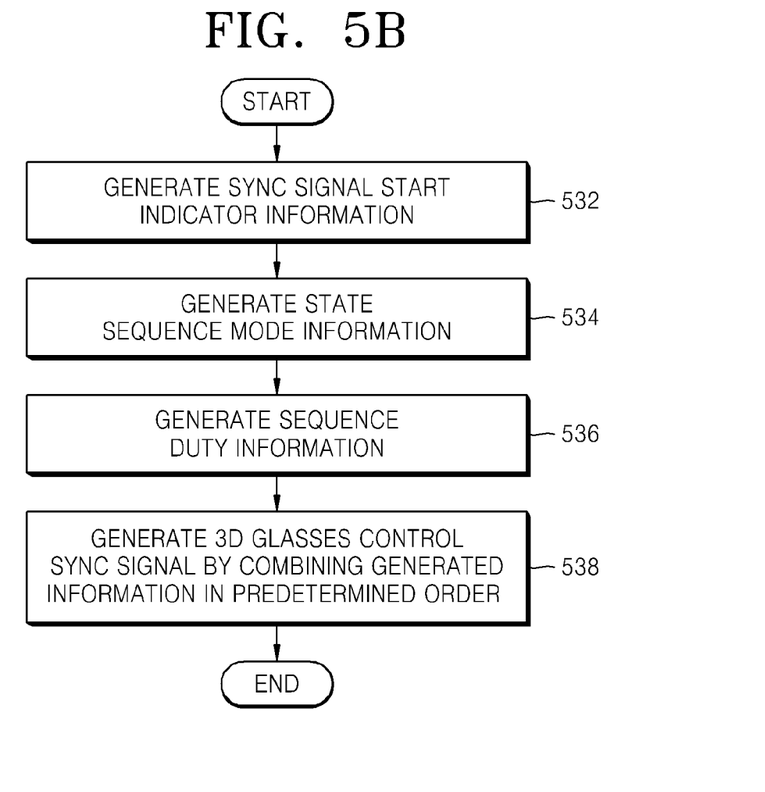
FIG. 5B is a flowchart illustrating a method of generating a 3D glasses control sync signal, according to another exemplary embodiment.

FIG. 5B is a flowchart illustrating a method of generating a 3D glasses control sync signal, according to another exemplary embodiment.

Referring to FIG. 5B, in operation 532, a synchronization transmitter 50 according to an exemplary embodiment generates sync signal start indicator information notifying a start of a 3D glasses control sync signal.

In operation 534, the synchronization transmitter 50 generates state sequence mode information indicating an operating state of 3D glasses 100 according to an exemplary embodiment in terms of whether a left glass or a right glass is opened or closed, and an operating order of the 3D glasses. The operating order of the 3D glasses is adjusted based on the operating characteristics of a 3D display to obtain optimum 3D performance.

In operation 536, the synchronization transmitter 50 generates sequence duty information indicating a retaining time period of the operating state of the 3D glasses. The retaining time period of the operating state of the 3D glasses is adjusted based on the operating characteristics of a 3D display to obtain optimum 3D performance.

In operation 538, the synchronization transmitter 50 generates a 3D glasses control sync signal by combining the pieces of generated information according to a set order.

The synchronization transmitter 50 transmits the 3D glasses control sync signal, including the sync signal start indicator information, the state sequence mode information, and the sequence duty information, to the 3D glasses 100.

Figure 6A:
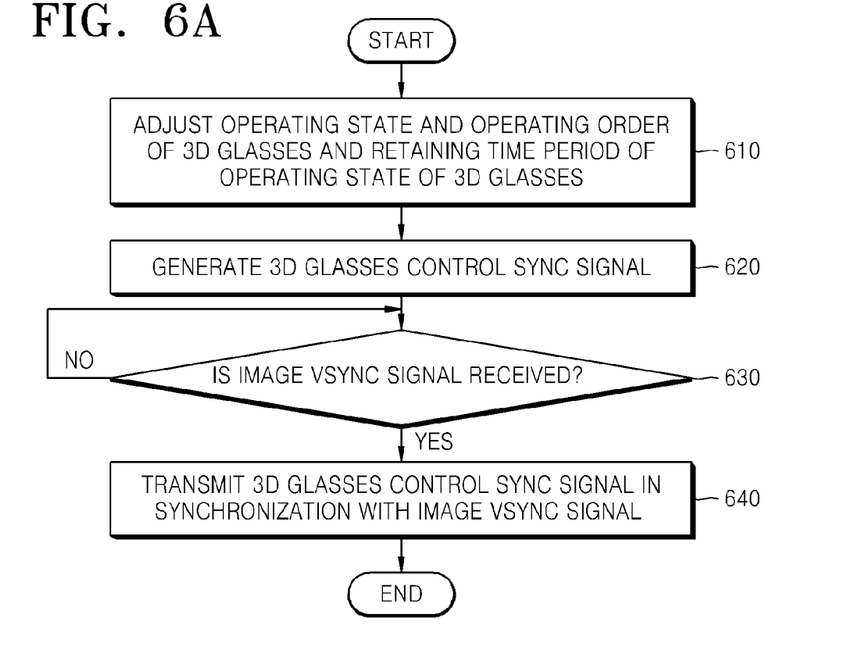
FIG. 6A is a flowchart illustrating a method of transmitting a 3D glasses control sync signal, according to an exemplary embodiment.

FIG. 6A is a flowchart illustrating a method of transmitting a 3D glasses control sync signal, according to an exemplary embodiment.

Referring to FIG. 6A, in operation 610, an operating state and an operating order of 3D glasses 100 according to an exemplary embodiment and a retaining time period of the operating state of the 3D glasses 100 are adjusted according to, for example, a manufacturer and a type of display in order to obtain optimum 3D performance.

In operation 620, a synchronization transmitter 50 according to an exemplary embodiment generates a sync signal start indicator field, a sync signal end indicator field, a sync signal period field, a state sequence mode field, and a sequence duty field while reflecting the adjusted operating state and operating order of the 3D glasses and the adjusted retaining time period of the operating state of the 3D glasses in the fields, and combines the generated fields according to a set order to generate a 3D glasses control sync signal.

The 3D glasses control sync signal may be generated at every period of N frames in synchronization with at least one of a left eye image and a right eye image that is displayed on the display 30, where N is a natural number greater than or equal to 1.

A period of the 3D glasses control sync signal may be variably generated at set frames.

In operation 630, the synchronization transmitter 50 checks whether the display device 10 has received an image Vsync signal.

In operation 640, when an image Vsync signal is detected, the synchronization transmitter 50 transmits a 3D glasses control sync signal to the 3D glasses 100 in synchronization with the image Vsync signal.

Figure 6B:
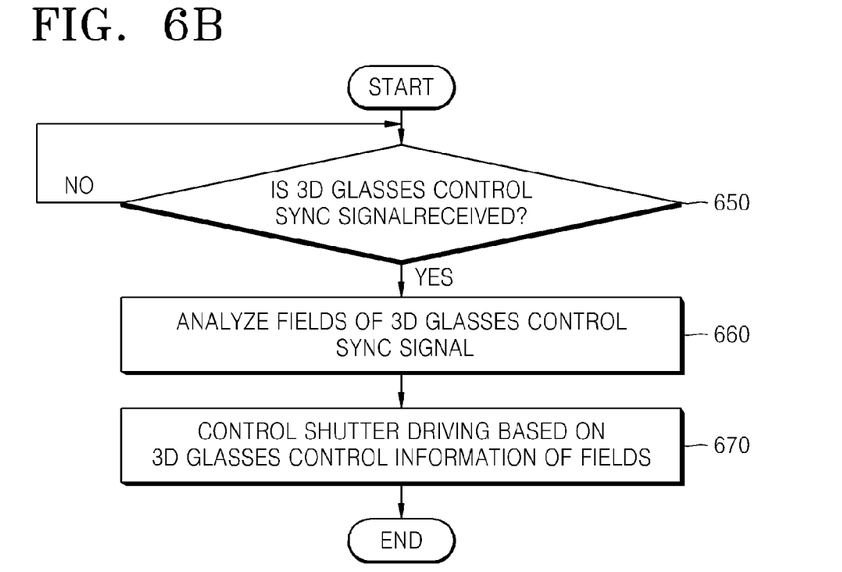
FIG. 6B is a flowchart illustrating a method of receiving a 3D glasses control sync signal, according to an exemplary embodiment.

FIG. 6B is a flowchart illustrating a method of receiving a 3D glasses control sync signal, according to an exemplary embodiment.

Referring to FIG. 6B, in operation 650, 3D glasses 100 according to an exemplary embodiment check whether a 3D glasses control sync signal has been received. For example, whether a 3D glasses control sync signal has been received is checked by counting a number of bits included in the 3D glasses control sync signal.

In operation 660, the 3D glasses 100 analyze 3D glasses controlling information of each of fields included in the 3D glasses control sync signal.

In operation 670, the 3D glasses 100 control an operation of a shutter based on information of each of the fields included in the 3D glasses control sync signal.

Figure 7:
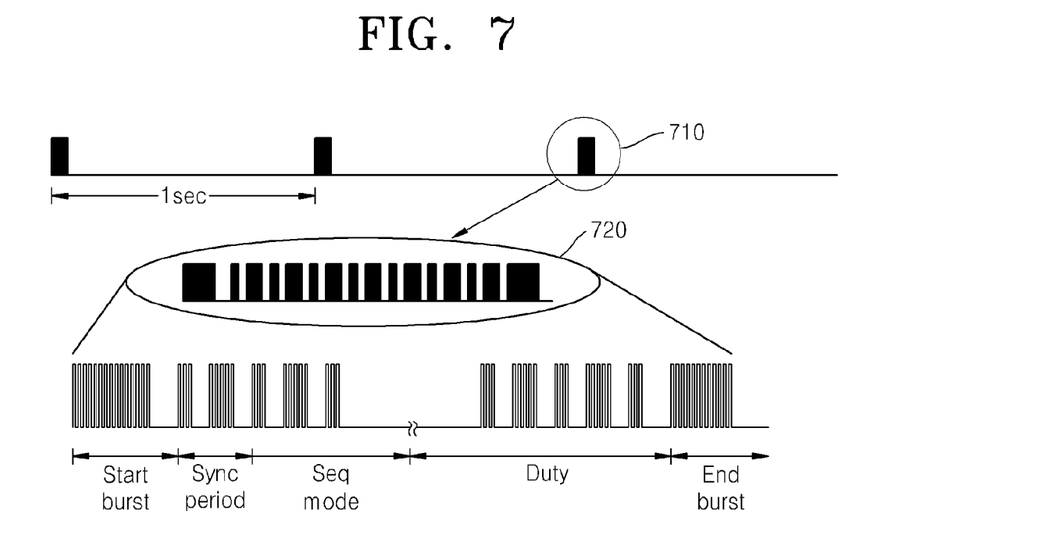
FIG. 7 is a timing diagram of a 3D glasses control sync signal being transmitted, according to an exemplary embodiment.

FIG. 7 is a timing diagram of a 3D glasses control sync signal 710 being transmitted, according to an exemplary embodiment.

Referring to FIG. 7, the 3D glasses control sync signal 710 having a predetermined carrier frequency is transmitted in N frames in synchronization with an image Vsync signal. For example, the 3D glasses control sync signal 710 may have a carrier frequency of 20.5 kHz for every 64 frames (about 1 sec). The period and the carrier frequency of the 3D glasses control sync signal 710 may be modified according to a manufacturer.

In FIG. 7, the 3D glasses control sync signal 710 is expanded in view to a 3D glasses control sync signal 720. The expanded-view 3D glasses control sync signal 720 includes a Start burst, a Sync period field, a Sequence mode field, a Duty field, and an End burst.

Figure 8:
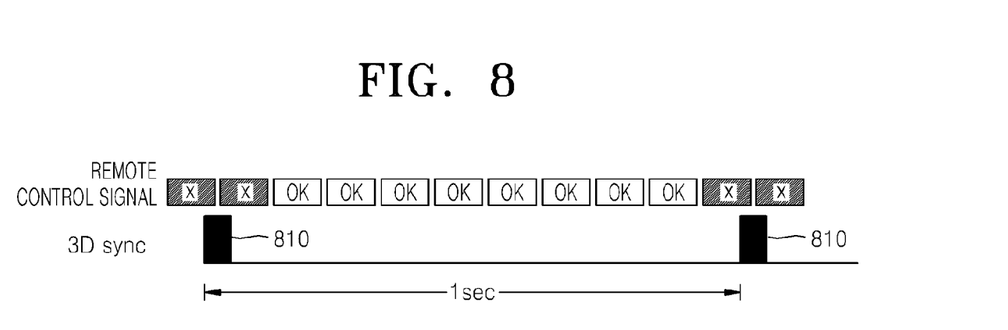
FIG. 8 is a waveform diagram for comparing a 3D glasses control sync signal (3D sync) according to an exemplary embodiment and an existing remote control signal.

FIG. 8 is a waveform diagram comparing a 3D glasses control sync signal 810 according to an exemplary embodiment and an existing remote control signal.

Referring to FIG. 8, assuming that a length of the existing remote control signal is from about several tens to hundreds ms, the 3D glasses control sync signal 810 and the existing remote control signal are compared.

The 3D glasses control sync signal 810 is generated at a longer period than a length of the existing remote control signal.

In a related art, a 3D glasses control sync signal is generated every 16.67 ms and thus interferes with all remote control signals. However, when generating the 3D glasses control sync signal 810 every second, a remote control signal is included within a 1 second-interval, thereby avoiding interference of the 3D glasses control sync signal with the existing remote control signal. That is, the 3D glasses control sync signal (3D sync) 810 is generated in regions outside a period of the existing remote control (regions "X"). Thus, the 3D glasses control sync signal 810 may avoid interference with the existing remote control signal.

While not restricted thereto, an exemplary embodiment can be written as computer programs and can be implemented in general-use digital computers that execute the programs using a computer readable recording medium. Examples of the computer readable recording medium include magnetic storage media (e.g., ROM, floppy disks, hard disks, etc.), and optical recording media (e.g., CD-ROMs, or DVDs).

While exemplary embodiments have been particularly shown and described with reference to the drawings, it will be understood by those skilled in the art that various changes in form and details may be made therein without departing from the spirit and scope of the inventive concept as defined by the appended claims. The exemplary embodiments should be considered in descriptive sense only and not for purposes of limitation. Therefore, the scope of the inventive concept is defined not by the detailed description of the exemplary embodiments but by the appended claims, and all differences within the scope will be construed as being included in the present inventive concept.

What is claimed is:

1. A method of generating a sync signal for controlling three-dimensional (3D) glasses in a 3D image system, the method comprising:

generating sync signal start indicator information notifying a start of a 3D glasses control sync signal, state sequence mode information indicating an operating state of the 3D glasses with regard to whether a left glass or a right glass is opened or closed, sequence duty information indicating a retaining time period of the operating state of the 3D glasses, and sync signal period information indicating a period of the 3D glasses control sync signal;

generating the 3D glasses control sync signal by combining the generated sync signal start indicator information, the generated state sequence mode information, the generated sequence duty information, and the generated sync signal period information according to a set order; and transmitting the generated 3D glasses control sync signal to the 3D glasses in synchronization with an image sync signal, wherein the period of the 3D glasses control sync signal indicates a time duration from a current sync burst of the 3D glasses control sync signal to a next sync burst of the 3D glasses control sync signal, and wherein the generated sync signal period information is distinctly included in the generated 3D glasses control sync signal, distinct from the generated sync signal start indicator information, the generated state sequence mode information, and the generated sequence duty information.

2. The method of claim 1, further comprising generating sync signal end indicator information notifying an end of the 3D glasses control sync signal.

3. The method of claim 1, further comprising generating delay period information indicating a delay time for operating the 3D glasses from a time when the 3D glasses control sync signal is received by the 3D glasses.

4. The method of claim 1, wherein the sequence duty information comprises a retaining time period of the operating state of the 3D glasses that is adjusted based on operating characteristics of a 3D display to obtain a desired 3D performance.

5. The method of claim 1, wherein the 3D glasses control sync signal is generated at every period of N frames in synchronization with at least one of a left eye image signal and a right eye image signal, where N is a natural number greater than or equal to 1.

6. The method of claim 1, wherein a period of the 3D glasses control sync signal varies at set frames.

7. The method of claim 1, wherein the 3D glasses control sync signal is generated at a longer period than a length of a remote control signal.

8. The method of claim 1, wherein the 3D glasses control sync signal is configured using a pulse modulation method.

9. The method of claim 1, further comprising transmitting the 3D glasses control sync signal to the 3D glasses in synchronization with an image sync signal.

10. A non-transitory computer-readable recording medium having embodied thereon a program for executing the method of claim 1.

11. The method of claim 1, wherein the generated 3D glasses control sync signal comprises the generated sync signal period information as at least one pulse signal, distinct from pulse signals corresponding to the generated sync signal start indicator information, the generated state sequence mode information, and the generated sequence duty information.

12. A method of transmitting a three-dimensional (3D) glasses control sync signal in a 3D image system, the method comprising:
adjusting an operating state and an operating order of 3D glasses and a retaining time period of the operating state of the 3D glasses;

generating the 3D glasses control sync signal comprising information about the adjusted operating state and the adjusted operating order of the 3D glasses, the adjusted retaining time period of the operating state of the 3D glasses, and sync signal period information indicating a period of the 3D glasses control sync signal, at a set frame period; and transmitting the generated 3D glasses control sync signal to the 3D glasses in synchronization with an image sync signal, wherein the period of the 3D glasses control sync signal indicates a time duration from a current sync burst of the 3D glasses control sync signal to a next sync burst of the 3D glasses control sync signal, and wherein the sync signal period information is distinctly included in the generated 3D glasses control sync signal, distinct from the information about the adjusted operating state and the adjusted operating order of the 3D glasses, the adjusted retaining time period of the operating state of the 3D glasses.

13. The method of claim 12, wherein the adjusting comprises adjusting the operating state and the operating order of the 3D glasses and the retaining time period of the operating state of the 3D glasses according to a display type in order to obtain optimum 3D performance.

14. A non-transitory computer-readable recording medium having embodied thereon a program for executing the method of claim 12.

15. A method of receiving a three-dimensional (3D) glasses control sync signal in a 3D image system, the method comprising:
receiving a 3D glasses control sync signal comprising information about an operating state and an operating order of 3D glasses, a retaining time period of the operating state of the 3D glasses, and sync signal period information indicating a period of the 3D glasses control sync signal;

generating a shutter driving control signal according to the information about the operating state and the operating order of the 3D glasses and the retaining time period of the operating state of the 3D glasses comprised in the received 3D glasses control sync signal; and driving a shutter of the 3D glasses according to the generated shutter driving control signal, wherein the period of the 3D glasses control sync signal indicates a time duration from a current sync burst of the 3D glasses control sync signal to a next sync burst of the 3D glasses control sync signal, and wherein the sync signal period information is distinctly included in the 3D glasses control sync signal distinct from the information about the operating state and the operating order of the 3D glasses, and the retaining time period of the operating state of the 3D glasses.

16. A non-transitory computer-readable recording medium having embodied thereon a program for executing the method of claim 15.

17. An apparatus for transmitting a three-dimensional (3D) glasses control sync signal of a 3D image system, the apparatus comprising:
a transmission control unit which generates a 3D glasses control sync signal comprising information about an operating state and an operating order of 3D glasses, a retaining time period of the operating state of the 3D glasses, and sync signal period information indicating a period of the 3D glasses control sync signal, at a set frame period; and a transmitting unit which transmits the 3D glasses control sync signal generated by the transmission control unit to the 3D glasses, wherein the period of the 3D glasses control sync signal indicates a time duration from a current sync burst of the 3D glasses control sync signal to a next sync burst of the 3D glasses control sync signal, and wherein the sync signal period information is distinctly included in the generated 3D glasses control sync signal, distinct from the information about the operating state and the operating order of the 3D glasses and the retaining time period of the operating state of the 3D glasses.

18. The apparatus of claim 17, wherein the transmitting unit comprises an infrared transmitting unit which modulates the 3D glasses control signal generated by the transmission control unit, to an infrared signal, and which transmits the infrared signal to the 3D glasses.

19. The apparatus of claim 17, wherein the 3D glasses control sync signal comprises a sync signal start indicator field notifying a start of the 3D glasses control sync signal, a sync signal period field indicating the period of the 3D glasses control sync signal, a state sequence mode field indicating the operating state of the 3D glasses with regard to whether a left glass or a right glass is opened or closed, a sequence duty field indicating the retaining time period of the operating state of the 3D glasses, and a sync signal end indicator field notifying an end of the 3D glasses control sync signal.

20. The apparatus of claim 17, wherein the transmission control unit generates the 3D glasses control sync signal at the set frame period in synchronization with a left eye image signal.

21. The apparatus of claim 17, wherein the transmission control unit generates the 3D glasses control sync signal at a longer period than a length of a remote control signal.

22. An apparatus for receiving a three-dimensional (3D) glasses control sync signal of a 3D image system, the apparatus comprising:

a receiving unit which receives a 3D glasses control sync signal comprising information about an operating state and an operating order of 3D glasses, a retaining time period of the operating state of the 3D glasses, and sync signal period information indicating a period of the 3D glasses control sync signal, in synchronization with an image sync signal;

a reception control unit which generates a shutter driving control signal based on the information about the operating state and the operating order of the 3D glasses and the retaining time period of the 3D glasses comprised in the 3D glasses control sync signal received by the receiving unit; and a glasses shutter unit which drives a shutter according to the shutter driving control signal generated by the reception control unit, wherein the period of the 3D glasses control sync signal indicates a time duration from a current sync burst of the 3D glasses control sync signal to a next sync burst of the 3D glasses control sync signal, and wherein the sync signal period information is distinctly included in the 3D glasses control sync signal, distinct from the information about the operating state and the operating order of the 3D lasses, and the retaining time period of the operating state of the 3D glasses.

23. A three-dimensional (3D) image system comprising:

a display device which generates an image sync signal for left eye and right eye 3D images;

a sync signal transmitting apparatus which transmits a 3D glasses control sync signal comprising information about an operating state and an operating order of 3D glasses, a retaining time period of the operating state of the 3D glasses, and sync signal period information indicating a period of the 3D glasses control sync signal, in synchronization with the image sync signal at a set frame period; and a sync signal receiving apparatus which receives the 3D glasses control sync signal from the sync signal transmitting apparatus to generate a shutter driving control signal based on the information about the operating state and the operating order of the 3D glasses and the retaining time period of the 3D glasses comprised in the 3D glasses control sync signal, wherein the period of the 3D glasses control sync signal indicates a time duration from a current sync burst of the 3D glasses control sync signal to a next sync burst of the 3D glasses control sync signal, and wherein the sync signal period information is distinctly included in the 3D glasses control sync signal, distinct from the information about the operating state and the operating order of the 3D glasses, and the retaining ti period of the operating state of the 3D glasses.

24. A method of generating a sync signal for controlling three-dimensional (3D) glasses in a 3D image system, the method comprising:

generating a 3D glasses control sync signal comprising information about an operating state and an operating order of the 3D glasses, a retaining time period of the operating state of the 3D glasses, and sync signal period information indicating a period of the 3D glasses control sync signal, at a set frame period; and transmitting the generated 3D glasses control sync signal, wherein the period of the 3D glasses control sync signal indicates a time duration from a current sync burst of the 3D glasses control sync signal to a next sync burst of the 3D glasses control sync signal, and wherein the sync signal period information is distinctly included in the generated 3D glasses control sync signal, distinct from the information about the operating state and the operating order of the 3D glasses, and the retaining time period of the operating state of the 3D glasses.

25. The method of claim 24, wherein the generating comprises generating the 3D glasses control sync signal by using a pulse modulation method.

26. The method of claim 24, wherein the generated 3D glasses control sync signal uses a carrier frequency range from 20-50 kHz.

27. A non-transitory computer-readable recording medium having embodied thereon a program for executing the method of claim 24.

28. A three-dimensional (3D) glasses comprising:

a receiving unit which receives a 3D glasses control signal comprising a synchronization (sync) signal period field;

a control unit which determines period information of a sync signal based on the sync signal period field, and generates a shutter driving control signal based on the determined period information; and a shutter unit which drives a shutter according to the generated shutter driving control signal, wherein the period information of a sync signal indicates a time duration from a current sync burst of the sync signal to a next sync burst of the sync signal, and wherein the sync signal period field is distinctly included in the generated 3D glasses control sync signal, distinct from information about an operating state and the operating order of the 3D glasses, and a retaining time period of the operating state of the 3D glasses.

29. The 3D glasses of claim 28, wherein:
the received 3D glasses control signal further comprises a delay field comprising delay information from a reference time defined by the 3D glasses and a display apparatus to an open or a close operation of the shutter; and
the control unit generates the shutter driving control signal according to the delay field.

30. The 3D glasses of claim 28, wherein:
the received 3D glasses control signal further comprises an indicating field which indicates that the shutter driving control signal is transmitted for a sync control of the 3D glasses and a display apparatus; and
the control unit generates the shutter driving control signal according to the indicating field.

31. The 3D glasses of claim 28, wherein:
the received 3D glasses control signal further comprises a mode field which defines at least one operation mode from among a dual-view mode, a two-dimensional (2D) mode, and an open and a close operation sequence of the shutter of the 3D glasses; and
the control unit generates the shutter driving control signal according to the mode field.

32. The 3D glasses of claim 28, wherein the receiving unit receives the 3D glasses control signal at a period of every N frames, where N is a natural number greater than or equal to 1.

33. The 3D glasses of claim 28, wherein the sync signal is a vertical synchronization (Vsync) signal.

34. The 3D glasses of claim 28, wherein:
the received 3D glasses control signal further comprises a duty field comprising a retaining time information of an open or a close operation of the shutter; and
the control unit generates the shutter driving control signal according to the duty field.

35. The 3D glasses of claim 28, wherein the receiving unit receives the 3D glasses control signal using one of Bluetooth, Zigbee and wireless local area network (WLAN).

36. A display apparatus comprising:
a display which alternately displays a left eye image and a right eye image;
a transmitting unit which transmits a three-dimensional (3D) glasses control signal to 3D glasses to control a shutter driving of the 3D glasses corresponding to the left eye image and the right eye image; and
a control unit which determines a synchronization (sync) signal period field comprising period information of a sync signal to determine a period of the shutter driving, and generates the 3D glasses control signal comprising the sync signal period field,
wherein the period information of a sync signal indicates a time duration from a current sync burst of the sync signal to a next sync burst of the sync signal, and
wherein the sync signal period field is distinctly included in the generated 3D glasses control sync signal, distinct from information about an operating state and the operating order of the 3D glasses, and a retaining time period of the operating state of the 3D glasses.

37. The display apparatus of claim 36, wherein the control unit determines a delay field comprising delay information from a reference time defined by the 3D glasses and the display apparatus to an open or a close operation of a shutter of the 3D glasses, and generates the 3D glasses control signal further comprising the delay field.

38. The display apparatus of claim 36, wherein the control unit determines an indicating field indicating that the 3D glasses control signal is transmitted for a sync control of the 3D glasses and the display apparatus, and generates the 3D glasses control signal further comprising the indicating field.

39. The display apparatus of claim 36, wherein the control unit determines a mode field indicating at least one operation mode from among a dual-view mode, a two-dimensional (2D) mode, and an open and a close operation sequence of a shutter of the 3D glasses, and generates the 3D glasses control signal further comprising the mode field.

40. The display apparatus of claim 36, wherein the transmitting unit transmits the 3D glasses control signal at a period of every N frames, where N is a natural number greater than or equal to 1.

41. The display apparatus of claim 36, wherein the sync signal is a vertical synchronization (Vsync) signal.

42. The display apparatus of claim 36, wherein the control unit determines a duty field comprising retaining time information of an open or a close operation of a shutter of the 3D glasses, and generates the 3D glasses control signal further comprising the duty field.

43. The display apparatus of claim 36, wherein the transmitting unit transmits the 3D glasses control signal using one of Bluetooth, Zigbee and WLAN.

44. A 3D eyeglasses comprising:
a left eye shutter;
a right eye shutter;
a radio frequency (RF) receiving unit configured to receive a 3D eyeglasses control signal transmitted via RF transmission, the 3D eyeglasses control signal comprising a plurality of data fields;
a control unit configured to generate a shutter driving control signal based on digital data contained in the data fields of the digitized 3D eyeglasses control signal; and
a glasses shutter unit which drives the left eye shutter and the right eye shutter according to the shutter driving control signal generated by the control unit,
wherein the 3D eyeglasses control signal comprises a sync signal period field containing data associated with a period of a synchronization (sync) signal at which the left and right shutters are to be operated,
wherein the data associated with a period indicates a time duration from a current sync burst of the sync signal to a next sync burst of the sync signal, and
wherein the sync signal period field is distinctly included in the generated 3D) glasses control sync signal, distinct from information about an operating state and the operating order of the 3D lasses, and a retaining time period of the operating state of the 3D lasses.

45. The 3D eyeglasses of claim 44, wherein the 3D eyeglasses control signal is received as a data packet having a start indicator, an end indicator and the plurality of data fields therebetween.

46. The 3D eyeglasses of claim 44, wherein the RF receiving unit comprises a Bluetooth receiving unit to receive the 3D eyeglasses control signal transmitted via Bluetooth transmission.

47. The 3D eyeglasses of claim 44, wherein the control unit is configured to generate the shutter driving control signal based on the data contained in the sync signal period field of the 3D eyeglasses control signal.

48. A method of operating 3D eyeglasses having a left eye shutter and a right eye shutter, the method comprising:
  receiving a 3D eyeglasses control signal transmitted via RF transmission, the 3D eyeglasses control signal comprising a plurality of data fields;
  generating a shutter driving control signal based on digital data contained in the data fields of the digitized 3D eyeglasses control signal; and
  driving the left eye shutter and the right eye shutter according to the generated shutter driving control signal,
  wherein the 3D eyeglasses control signal comprises a sync signal period field containing data associated with a period of a synchronization (sync) signal at which the left and right shutters are to be operated,
  wherein the data associated with a period indicates a time duration from a current sync burst of the sync signal to a next sync burst of the sync signal, and
  wherein the sync signal period field is distinctly included in the generated 3D glasses control sync signal, distinct from information about an operating and the operating order of the 3D glasses, and a retaining time period of the operating state of the 3D glasses.

49. The method of claim 48, wherein the 3D eyeglasses control signal is received as a data packet having a start indicator, an end indicator and the plurality of data fields therebetween.

50. The method of claim 48, wherein the 3D eyeglasses control signal is transmitted via Bluetooth transmission.

51. The method of claim 48, wherein the shutter driving control signal is generated based on the data contained in the sync signal period field of the 3D eyeglasses control signal.

* * * * *